(12) United States Patent
Mansour et al.

(10) Patent No.: US 8,787,477 B2
(45) Date of Patent: Jul. 22, 2014

(54) METHODS FOR ASSIGNING CODEWOODS TO POINTS IN HEXAGONAL CONSTELLATIONS IN DIGITAL COMMUNICATION SYSTEMS

(71) Applicant: Texas Instruments Incorporated, Dallas, TX (US)

(72) Inventors: Mohamed Farouk Mansour, Richardson, TX (US); Srinath Hosur, Plano, TX (US); JuneChul Roh, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/030,338

(22) Filed: Sep. 18, 2013

(65) Prior Publication Data

US 2014/0079162 A1    Mar. 20, 2014

Related U.S. Application Data

(60) Provisional application No. 61/702,556, filed on Sep. 18, 2012.

(51) Int. Cl.
*H04L 5/12* (2006.01)
*H04L 27/36* (2006.01)

(52) U.S. Cl.
USPC .................... 375/262; 375/265; 375/298

(58) Field of Classification Search
USPC ................... 375/261, 262, 265, 298, 341
See application file for complete search history.

(56) References Cited

U.S. PATENT DOCUMENTS

| 5,150,381 A | * | 9/1992 | Forney et al. ............ 375/261 |
| 5,195,107 A | * | 3/1993 | Wei ......................... 375/290 |
| 5,214,672 A | * | 5/1993 | Eyuboglu et al. ......... 375/254 |

* cited by examiner

*Primary Examiner* — Don N Vo
(74) *Attorney, Agent, or Firm* — Steven A. Shaw; Frederick J. Telecky, Jr.

(57) ABSTRACT

Embodiments of the invention provide a methods for the assignment of codewords to the available constellation points to minimize the Hamming distance between adjacent codewords. An hexagonal constellation is modeled as a two-dimensional trellis with an horizontal axis varying across a plurality of constellation points and a vertical axis varying across a plurality of codewords $[0, 1, \ldots, N-1]$. A best path through the trellis is found to select a single constellation point per each codeword where a codeword is to be assigned. A each state in the transition across the trellis diagram, a current score and the best path that leads to the state is stored in a memory. Each codeword is assigned to the selected constellation point. The hexagonal constellation is used for transmitting data in a communication system.

36 Claims, 5 Drawing Sheets

METHODS FOR ASSIGNING CODEWOODS TO POINTS IN HEXAGONAL CONSTELLATIONS IN DIGITAL COMMUNICATION SYSTEMS

CROSS-REFERENCE TO RELATED APPLICATIONS

This application claims priority to U.S. Provisional Application 61/702,556 filed Sep. 18, 2012. Said application incorporated herein by reference

STATEMENT REGARDING FEDERALLY SPONSORED RESEARCH OR DEVELOPMENT

Not applicable.

BACKGROUND

Embodiments of the invention are directed, in general, to communication systems and, more specifically, design and decoding of hexagonal constellations.

Unlike regular QAM constellations where all constellation points within a given span are occupied, the hexagonal constellation has unused constellation points. The hexagonal constellation points are in general parameterized by two integers u and v, and the (x, y) coordinate for the i-th constellation point could be expressed as:

$$(x_i, y_i) = \sqrt{E_g}\left((x_0, y_0) + u_i(1, 0) + \left(\frac{1}{2}, \frac{\sqrt{3}}{2}\right)\right) \quad (1)$$

where $(x_0, y_0)$ is a fixed perturbation that could be used to minimize the maximum energy. The minimum distance $d_{min}$ between adjacent constellation points is $\sqrt{E_g}$ any orthogonal rotation of coordinates does not change the constellation properties. Define the constellation average energy as:

$$E_{av} \Box \sqrt{E_g} \sum_{i=1}^{N} \left\| x_0 + u_i + \frac{v_i}{2}, y_0 + \frac{v_i \sqrt{3}}{2} \right\| \quad (2)$$

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Codeword Assignment Optimization

In most practical coding systems, bits are used rather than symbols in the code. This is primarily because bits are relatively simple to handle and independent of the modulation order. Therefore, the optimization of Bit Error Rate (BER) is usually the more important criterion in error characterization. The mapping from SER to BER depends on the average Hamming distance between the codewords of adjacent constellation points. Let Λ denote the set of 2-tuples constellation points within $d_{min}$ of each other. The average Hamming distance for a hexagonal constellation of order N is defined as:

$$\gamma \Box \frac{1}{|\Lambda|} \sum_{(c,c') \in \Lambda} d(c, c') \quad (3)$$

where d (c, c') denotes the Hamming distance between the codewords c and c', and |Λ| denotes the order of the set Λ. For Gray coding, which is usually used for QAM constellations, we have γ=1. For relatively high SNR, we have $$BER \approx \frac{\gamma}{\log_2 N} SER \quad (4)$$

It is straightforward to show that for hexagonal constellations γ>1. The optimization problem for codeword assignment may be stated as follows: for a given hexagonal constellation of size N, assign the codewords [0, 1, . . . , N−1] to the constellation points so as to minimize γ in (3). This is an assignment optimization problem which is known to be NP-hard. In the following, a suboptimal dynamic programming problem that provides an efficient approximation for the solution is disclosed.

Dynamic Programming Solution

The hexagonal constellation is modeled as a two-dimensional trellis with the horizontal axis varies across the constellation points and the vertical axis varies across the codewords. The final solution of the optimization problem is the best path through the trellis where each codeword is assigned to a single constellation point. This optimal path is computed using a Viterbi-like algorithm as described below.

The first state in the horizontal axis is chosen as an arbitrary constellation point. Without loss of generality, the all-zero codeword is assigned to the first constellation point. In the transition across the trellis diagram, at each state the current score and the best path that leads to this state is stored. This path includes 2-tuple elements for the earlier constellation point and the corresponding codeword.

Let $S_i(\tau)$ is the score of the i-th codeword value for the i-th constellation point. The initialization of the trellis expansion is $S_0(0)=0$ $S_i(0)=\infty$, for $1 \le i \le N-1$ \quad (5)

Let $P_i(\tau) \Box \{c_t^{(i)}\} t \le \tau$ denotes the best path to i-th state at time τ. From the definition we always have $c_\tau^{(i)} = i$. A fully connected trellis is assumed, (i.e., each state at τ is connected to all states at τ+1. As in the common Viterbi algorithm, the updated score at τ+1 is computed as:

$$S_i(\tau+1) = \min_j \{S_j(\tau) + \rho^{(\tau+1)}(i,j)\} \quad (6)$$

where $\rho^{(\tau+1)}(i,j)$ is cost for transition from state $S_j(\tau)$ to state $S_i(\tau+1)$. Let $S_{\hat{j}}(\tau)$ denote the best predecessor state for $S_i(\tau+1)$, i.e., $$\hat{j} = \arg\min_j \{S_j(\tau) + \rho^{(\tau+1)}(i,j)\} \quad (7)$$

Then the update path, $\tau+1$ becomes $$P_i(\tau+1) = \{P_{\hat{j}}(\tau), i\} \quad (8)$$

Then we are left by the computation of $\rho^{(\tau+1)}(i,j)$. This is a sequential computation of $\tau$ in (3). Further, in a given path, each codeword appears once. This could be phrased as:

$$\rho^{(\tau+1)}(i,j) = \infty\, i \in P_j(\tau) \quad (9)$$

if $i \notin P_j(\tau)$, then let $\Lambda^{(\tau+1)}(i,j) \subseteq P_j(\tau)$ denote the set of codewords whose constellation points are immediate neighbors to the constellation point at $(\tau+1)$. Then, $$\rho^{(\tau+1)}(i,j) = \sum_{c \in \Lambda^{(\tau+1)}(i,j)} d(c,i) \quad (10)$$

where as earlier $d(\ldots)$ denotes the Hamming distance. After completing the trellis expansion, each end state has a scaled value of (3). This is not a terminated search. Therefore, as in the common Viterbi algorithm, the final state is the one with the best score, i.e., $$\hat{S} = \arg\min_j \{S_j(N-1)\} \quad (11)$$

The resulting codeword assignment is simple the best path leading to $\hat{S}$.

The suboptimality of the proposed algorithm stems from the fact that the model is not entirely Markovian, i.e., states at time $\tau$ does not carry all the information needed for future computation of the optimal cost function. Therefore, keeping only the best path leading to the state trims some potentially good paths in future processing. This suboptimality could be partially alleviated by careful ordering of the constellation points. As mentioned earlier, the starting constellation point may be arbitrarily chosen. Then, subsequent constellation points may be are ordered in ascending order by the distance to the first point. Further, the procedure is repeated with different starting constellation points and the codeword assignment that yields the best score is chosen.

Complexity: The memory is the bottleneck in the computation since the whole path may be to be stored during the trellis expansion. The length for each path is N and N distinct paths at each trellis step (corresponding to the number of possible codeword values) is to be kept. Therefore, the overall memory complexity is $O(N^2)$. This complexity could be significantly reduced by continuous pruning of incompetent paths.

The computational complexity of the trellis expansion is linear with the number of states, which is the biggest advantage in the tradeoff with optimality. The optimality/complexity tradeoff could be further tuned by controlling the number of times the trellis expansion procedure is repeated with different initial constellation point.

EXAMPLES

The procedure is run for many orders of the hexagonal constellation. The constellation points are the output of the constellation design procedure outlined herein. The results of the codeword assignment optimization are summarized in the Table 1.

TABLE 1

AVERAGE HAMMING DISTANCE FOR DIFFERENT CONSTELLATION ORDERS

| | Constellation order | | | | | | |
|---|---|---|---|---|---|---|---|
| | 16 | 32 | 64 | 128 | 256 | 512 | 1024 |
| Av. Hamming Distance ($\gamma$) | 1.33 | 1.39 | 1.42 | 1.46 | 1.51 | 1.56 | 1.59 |

Figure 1:
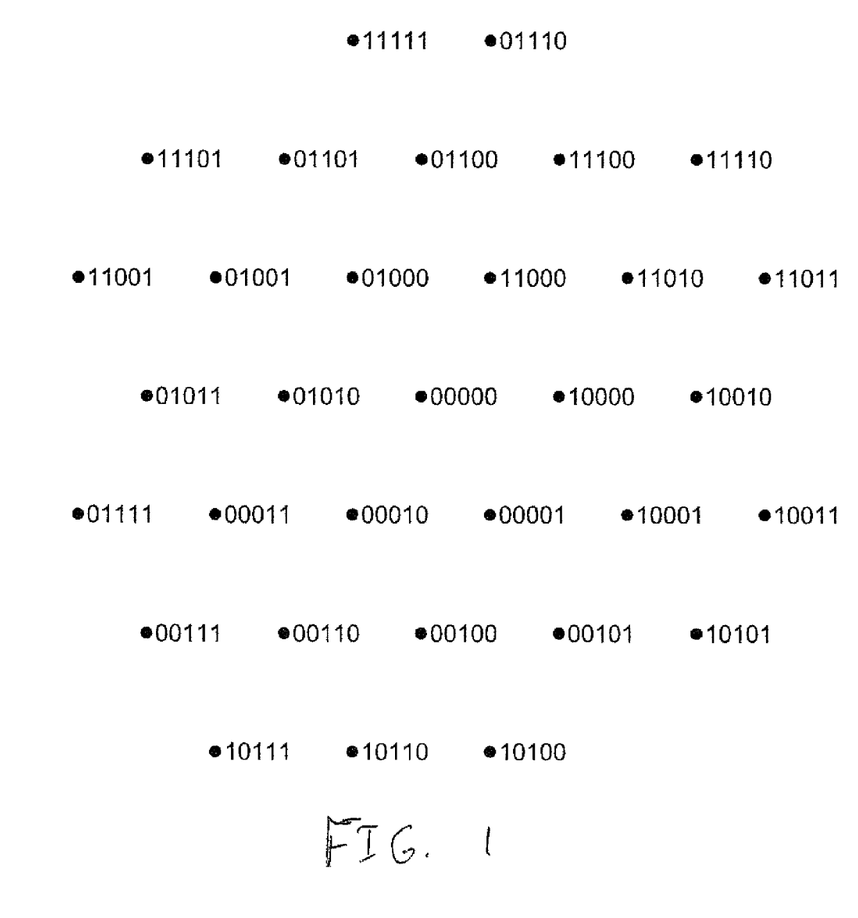
FIG. 1 is a diagram of an example of codeword assignment for constellation order 32-HEX.

An example of the codeword assignment for constellation order 32 is shown in FIG. 1.

Constellation Optimization

The hexagonal constellation offers optimal packing of constellation points within a given area, i.e., with a given maximum energy. Therefore, if the constellation size is predetermined, then there are more constellation points than the grid size within a given maximum energy. The optimization objective in the constellation design is to maximize the minimum distance between adjacent constellation points $d_{min}$ and/or minimize the peak energy under the constraint $E_{av}=1$. The decision variables in this case are the choice of the hexagonal constellation points (from the redundant set of points) and the offset $(x_0, y_0)$ in (1).

This problem is a mixed-integer programming problem which is combinatorial for the constellation point choices while the offset prameters $(x_0, y_0)$ are continuous. To simplify, the combinatorial problem we restrict the search space. Since the biggest impact on $E_{av}$ (and hence $d_{min}$) comes from high energy constellation points, the combinations of a small subset of high energy points are studied. This subset includes all constellation points of the highest and next to highest energy. Typically, only half of the points in the search set may be included in the constellation. An search is used for picking the best combination of constellation points in the search subset. For each combination, a line-search is preformed for the optimal value of $(x_0, y_0)$ with a search span $[-\sqrt{E_g}, \sqrt{E_g}]$. For each combination of the constellation point and $(x_0, y_0)$, $d_{min}$ is computed which equals $\sqrt{E_g}$ after normalizing $E_{av}$ in (2) to unity provided the peak-to-average ratio is smaller than a given threshold. The optimal constellation grid is the one that maximizes drain over this search.

Figure 2A:
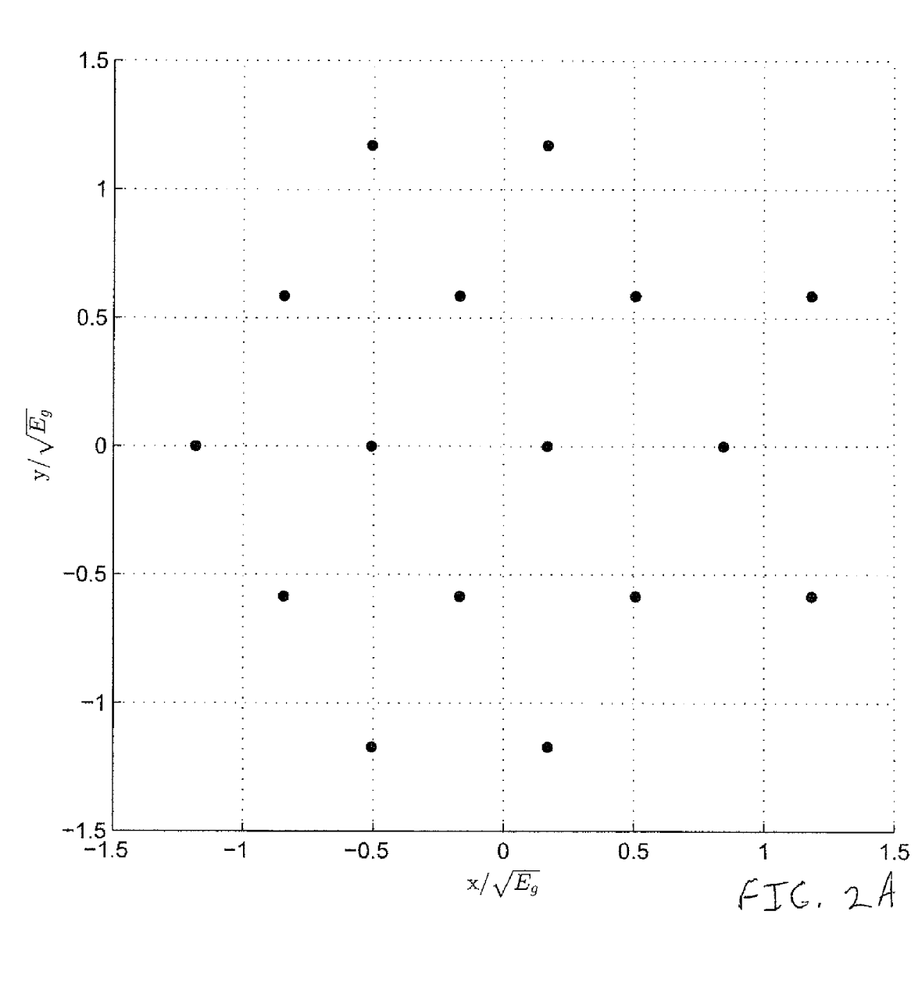
FIG. 2A is a diagram showing 16-HEX constellation.
Figure 2B:
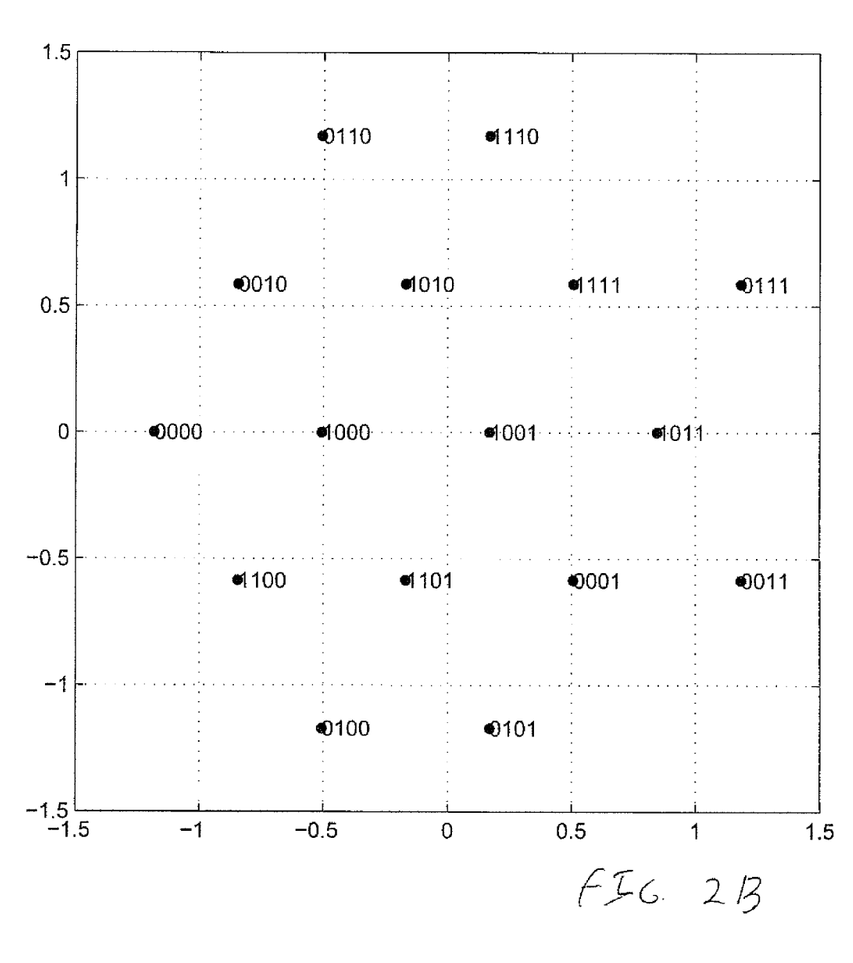
FIG. 2B is a diagram of an example of codeword assignment for constellation order 16-HEX as shown in FIG. 2A.

The impact of the constellation offset is more prominent for small order because of the relatively large ratio between the offset power and the other constellation point power. However, it has negligible effect for high constellation order. In FIG. 2, an example of 16-HEX constellation where $(x_0, y_0) = (0.25\sqrt{E_g}, 0)$ is provided.

Puncturing

As shown in the above, it is advantageous (from the BER perspective) to have fewer pairs of constellation points within $d_{min}$. This could be incorporated in the optimization problem by joint maximization of $d_{min}$ and minimization of the number of pair points within $d_{min}$. This could also be done by puncturing the resulting constellation of the original optimization problem to remove some of the high energy constellation points with large number of immediate neighbors by other constellation points with fewer number of immediate neighbors. This puncturing procedure is a trade-off between the peak-to-average ratio (which increases slightly) and the average Hamming distance as will be defined below.

Figure 3:
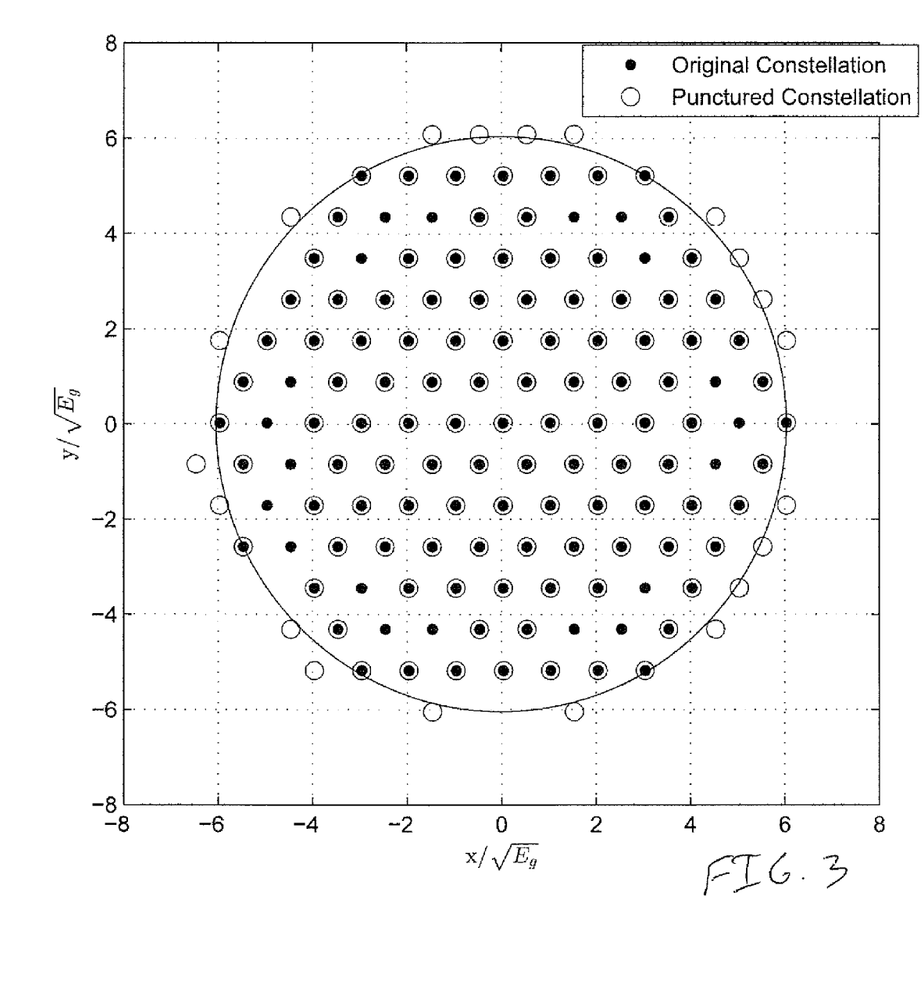
FIG. 3 is a diagram showing original and punctured 128-HEX constellations with 20 punctured constellation points.

An example of the puncturing procedure is shown in FIG. 3 for HEX-128 constellation, the punctured points to is limited to 20. For $E_{av}=1$ for both original and punctured constellations, $d_{min}$ is reduced by 0.5 dB, while $E_{max}$ increased by 0.08 dB. However, the number of constellation pairs that are within $d_{min}$ is reduced by 15%. This has a direct impact on the codeword assignment problem that balances $d_{min}$ loss for compute the BER. The punctured HEX-128 constellation in FIG. 3 has $\gamma=1.44$, which is proportional to the smaller number of immediate neighbors as discussed above. Stronger puncturing would in general produces smaller (for example, increasing the puncturing points to 30 gives $\gamma=1.40$). This provides an optimization tool for a trade-off between $d_{min}$ and $\gamma$.

Decoding

Unlike regular QAM constellations where all constellation points within a given span is occupied, the hexagonal constellation has unused constellation points. This necessitates the use of lookup tables for decoding to indicate whether a particular constellation point is used, and the corresponding codeword for the used constellation points. To simplify the decoding process, the indexing in the lookup tables uses the two integers u and v in (1).

Hard Decoding

The structure of the hexagonal constellation in (1) provides a procedure for finding the nearest neighbor. If the normalized received symbol $r/\sqrt{E_g}=(x, y)$, then from, the initial estimate of u and v could be computed as:

$$\bar{v}=2(y-y_0)/\sqrt{3} \quad (12)$$

$$\bar{u}=x-x_0-(y-y_0)/\sqrt{3} \quad (13)$$

which are in general non-integer. To get the nearest neighbor, the Euclidean distance to the immediate four neighbors is computed. This corresponds to the immediate upper and lower integers for $\bar{u}$ and $\bar{v}$, and pick the one that corresponds to the smalling distance (provided it is used in the constellation). The complexity of computing the Euclidean distance to the four neighbors is slightly higher than the complexity of computing a single Euclidean distance. For example, let $d_f^2$ denotes the square of the Euclidean distance between the received symbol and to the constellation point with $(\lfloor \bar{u} \rfloor, \lfloor \bar{v} \rfloor)$, $$d_f^2 = \left\| \Delta_u + \frac{\Delta_v}{2}, \frac{\Delta_v \sqrt{3}}{2} \right\|^2 \quad (14)$$

where $\Delta_u \square \bar{u}-\lfloor \bar{u} \rfloor$ and $\Delta_v \square \bar{v}-\lfloor \bar{u} \rfloor$. Then the distance to the constellation point with $(\lfloor \bar{u} \rfloor \pm 1, \lfloor \bar{v} \rfloor)$ becomes $$d_1^2 = d_f^2 + 1 \pm (2\Delta_u + \Delta_v) \quad (15)$$

which does not require any multiplication. All other immediate neighbors could be computed similarly.

Soft Decoding

If error correcting codes, e.g., Low Density Parity Check LDPC or Turbo coding, are used, then soft decoding information for bits needs to be computed. Because of the irregular assignment of the codewords to constellation points and the existence of unused constellation points within the grid, a lookup table may be necessary.

The indexing of the lookup table uses the (u, v) coordinates which provide unique description of each constellation point. Unused constellation point are flagged in the lookup table. To simplify the implementation, the size of the lookup table is bigger than the actual grid size. The entries of the table are the codewords of the actual constellation points.

The first step in the soft decoding is to compute $\bar{u}$ and $\bar{v}$. Then compute the distances to immediate neighbors of $(\bar{u}, \bar{v})$ using the simplified algorithm described above. For the i-th bit $b_i$ in the symbol, define $$\sum_i^1$$

for $b_i$ the set of immediate neighbors with $b_i=1$ in the corresponding codeword, and similarly $$\sum_i^0 \text{ for } b_i = 1.$$

Then, the likelihood ratio (LLR) of $b_i$ is as follows (assuming equiprobale codewords):

$$L(b_i) = \frac{\sum_{c \in \Sigma_i^1} \rho(r|c)}{\sum_{c \in \Sigma_i^0} \rho(r|c)} \quad (16)$$

For numerical tractability, the LLR is clipped if it is larger or smaller predefined threshold $\pm \eta$. If all the surrounding neighbors have the same value for $b_i$ then L $(b_i)$ is set to $\pm \eta$ depending on the value of $b_i$. For Additive white Gaussian Noise (AWGN) channels, the above likelihood could be simplified to $$L(b_i) = \min_{c \in \Sigma_i^0} \|r-c\|^2 - \min_{c \in \Sigma_i^1} \|r-c\|^2 \quad (17)$$

Figure 4:
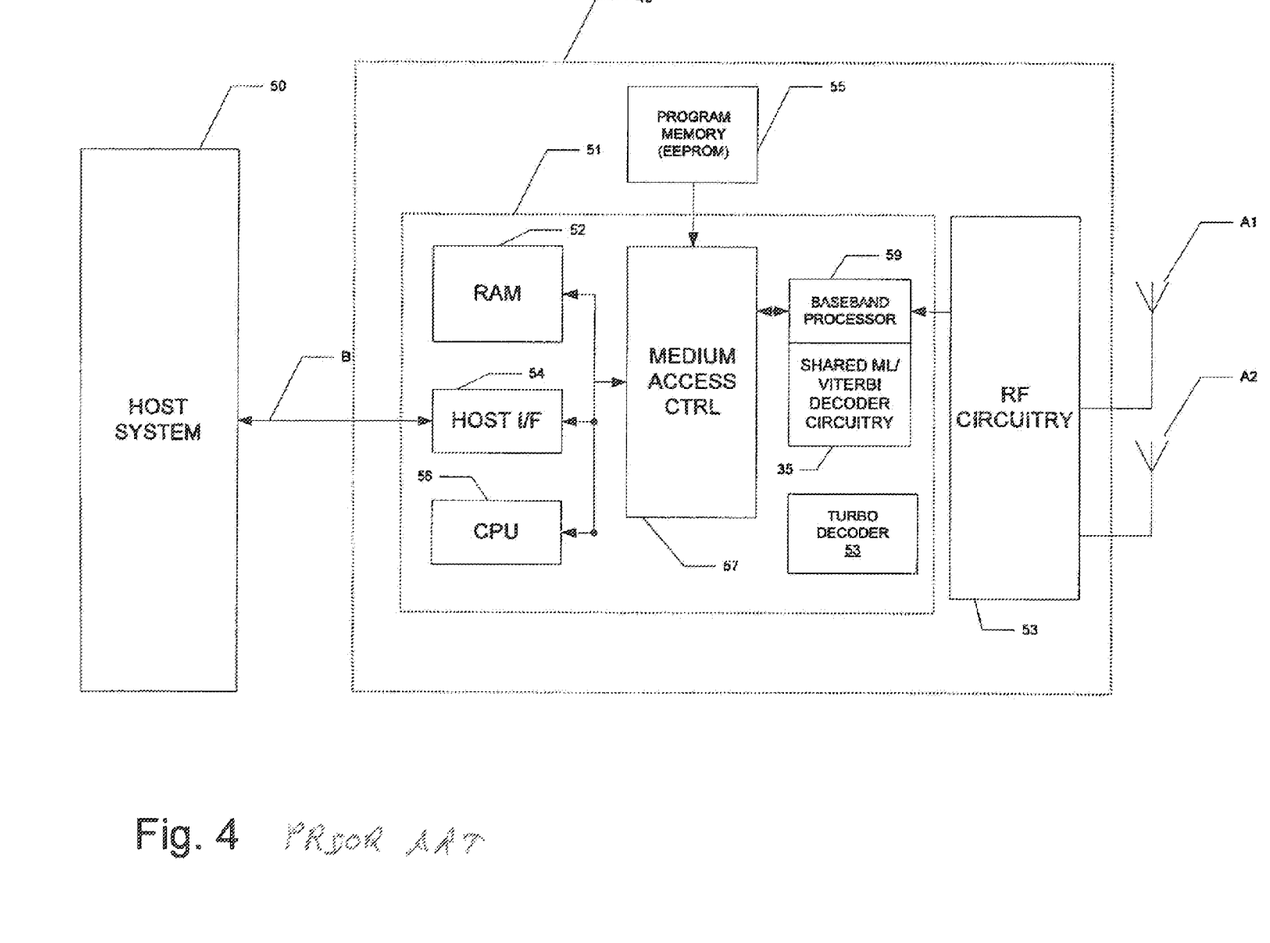
FIG. 4 is an electrical diagram, in block form, of the construction of an implementation of a receiver system.

FIG. 4 is illustrative of the construction of a transceiver system in which an embodiment of the invention may operate. Of course, it is contemplated that other architectures and approaches to realizing this transceiver system may also be used, as will be apparent to those skilled in the art having reference to this specification. Transceiver 45 according to this embodiment of the invention, illustrated in FIG. 4, includes the circuitry and functionality necessary and appropriate for carrying out the functions of a transmitter/receiver.

In FIG. 4, transceiver 45 is coupled to host system 50 by way of a corresponding bus B. Host system 50 corresponds to a personal computer, a laptop computer, or any sort of computing device capable of wireless broadband communications, in the context of a wireless local area network (LAN), wide area network (WAN), or "metro" area network (MAN); of course, the particulars of host system 50 will vary with the particular application.

Transceiver 45 in this example includes modem processor 51, which is bidirectionally coupled to bus B on one side, and to radio frequency (RF) circuitry 53 on its other side. RF circuitry 53, which may be realized by conventional RF circuitry known in the art, performs the analog demodulation, amplification, and filtering of RF signals received over the wireless channel and the analog modulation, amplification, and filtering of RF signals to be transmitted by transceiver 45 over the wireless channel, one or more antennae A1 and A2. As such, RF circuitry 53 includes front end functions. The architecture of modem processor 51 into which this embodiment of the invention can be implemented follows that of a conventional single-chip media access controller (MAC) and a baseband processor. It is contemplated that the architecture of other transceiver installations, including for wireless broadband communications, whether on the network or client side, can follow a similar generic approach, as modified for the particular application location, as known in the art. This exemplary architecture includes embedded central processing unit (CPU) 56, for example realized as a reduced instruction set (RISC) processor, for managing high level control functions within modem processor 51. For example, embedded CPU 56 manages host interface 54 to directly support the appropriate physical interface to bus B and host system 50. Local RAM 52 is available to embedded CPU 56 and other functions in modem processor 51 for code execution and data buffering. Medium access controller (MAC) 57 and baseband processor 59 are also implemented within modem processor 51 according to the preferred embodiments of the invention, for generating the appropriate packets for wireless communication, and providing encryption, decryption, and wired equivalent privacy (WEP) functionality. In this regard, it is contemplated that baseband processor 59 may be realized by way of a digital signal processor (DSP) "core", for example having the computational capacity of a modern DSP integrated circuit such as one of the TMS320C64x family of digital signal processors available from Texas Instruments Incorporated (Dallas Tex.). Program memory 55 is provided within transceiver 45, for example in the form of electrically erasable/programmable read-only memory (EEPROM), to store the sequences of operating instructions executable by modem processor 51, including control instructions for carrying out the constellation assignment and encoding sequences, current score and the best path that leads to a state while traversing the trellis according to the preferred embodiment of the invention. Also included within transceiver 45, in the form of a wireless adapter, are other typical support circuitry and functions that are not shown, but that are useful in connection with the particular operation of transceiver 45.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation. A plurality is one or more.

What is claimed is:

1. A method comprising:
    modeling an hexagonal constellation as a two-dimensional trellis with an horizontal axis varying across a plurality of constellation points and a vertical axis varying across a plurality of codewords [0, 1, . . . , N−1];
    finding a best path through the trellis to select a single constellation point per each codeword where a codeword from the plurality of codewords is to be assigned in the transition across the trellis diagram, at each state, a current score and the best path that leads to the state is stored in a memory;
    assigning each codeword of the plurality of codewords to the selected constellation point from the plurality of constellation points for a hexagonal constellation; and
    using the hexagonal constellation for transmitting data.

2. The method of claim 1, wherein the best path is computed using a Viterbi-like algorithm, where a metric is a cumulative Hamming distance between the codewords of neighbor constellation points.

3. The method of claim 2, further comprising providing an initialization of the trellis expansion.

4. The method of claim 3, further comprising finding a set of codewords whose constellation points are immediate neighbors to a constellation point at a future time.

5. The method in claim 4, further comprising updating a cumulative Hamming distance by a Hamming distance between the codewords of neighbor constellation points.

6. The method of claim 4, further comprising ordering subsequent constellation in an ascending order by a distance to the first point.

7. The method of claim 6, further comprising restricting a search space based on an energy value.

8. The method of claim 7, further comprising puncturing the resulting constellation to remove some of the high energy valued constellation points with large number of immediate neighbors by other constellation points with fewer number of immediate neighbors.

9. The method of claim 1, wherein a first state in the horizontal axis is chosen as an arbitrary constellation point.

10. The method of claim 1, wherein an all-zero codeword is assigned to a first constellation point.

11. The method of claim 1, wherein the path includes 2-tuple elements for an earlier constellation point and the corresponding codeword.

12. The method of claim 1, further comprising continuously pruning incompetent paths.

13. A device comprising:
    a transmitter; at least one antenna coupled to the transmitter for transmitting a signal over a wireless channel;
    a processor, coupled to the transmitter;
    a computer-readable medium including computer-readable instructions stored therein that, upon execution by the processor, perform operations comprising:
    modeling an hexagonal constellation as a two-dimensional trellis with an horizontal axis varying across a plurality of constellation points and a vertical axis varying across a plurality of codewords [0, 1, . . . , N−1];
    finding a best path through the trellis to select a single constellation point where a codeword from the plurality of codewords is to be assigned in the transition across the trellis diagram, at each state, a current score and the best path that leads to the state is stored in a memory;
    assigning each codeword of the plurality of codewords to the selected constellation point from the plurality of constellation points for a hexagonal constellation; and
    using the hexagonal constellation for transmitting data.

14. The device of claim 13, wherein the best path is computed using a Viterbi-like algorithm, where a metric is a cumulative Hamming distance between the codewords of neighbor constellation points.

15. The device of claim 14, further comprising providing an initialization of the trellis expansion.

16. The device of claim 15, further comprising finding a set of codewords whose constellation points are immediate neighbors to a constellation point at a future time.

17. The device of claim 16, further comprising ordering subsequent constellation in an ascending order by a distance to the first point.

18. The device in claim 16, further comprising updating a cumulative Hamming distance by a Hamming distance between the codewords of neighbor constellation points.

19. The device of claim 18, further comprising restricting a search space based on an energy value.

20. The device of claim 19, further comprising puncturing the resulting constellation of to remove some of the high energy valued constellation points with large number of immediate neighbors by other constellation points with fewer number of immediate neighbors.

21. The device of claim 13, wherein a first state in the horizontal axis is chosen as an arbitrary constellation point.

22. The device of claim 13, wherein an all-zero codeword is assigned to a first constellation point.

23. The device of claim 13, wherein the path includes 2-tuple elements for an earlier constellation point and the corresponding codeword.

24. The device of claim 13, further comprising continuously pruning incompetent paths.

25. A computer program product of computer-readable instructions, tangibly embodied on a non-transitory computer-readable medium and executable by a digital data processor to perform actions directed toward transmitting a signal, the computer-readable instructions configured to cause a device to:
   modeling an hexagonal constellation as a two-dimensional trellis with an horizontal axis varying across a plurality of constellation points and a vertical axis varying across a plurality of codewords [0, 1, . . . , N−1];
   finding a best path through the trellis to select a single constellation point where a codeword from the plurality of codewords is to be assigned in the transition across the trellis diagram, at each state, a current score and the best path that leads to the state is stored in a memory;
   assigning each codeword of the plurality of codewords to the selected constellation point from the plurality of constellation points for a hexagonal constellation; and
   using the hexagonal constellation for transmitting data.

26. The computer program product of claim 25, wherein the best path is computed using a Viterbi-like algorithm, where a metric is a cumulative Hamming distance between the codewords of neighbor constellation points.

27. The computer program product of claim 26, further comprising providing an initialization of the trellis expansion.

28. The computer program product of claim 27, further comprising finding a set of codewords whose constellation points are immediate neighbors to a constellation point at a future time.

29. The computer program product in claim 28, further comprising updating a cumulative Hamming distance by a Hamming distance between the codewords of neighbor constellation points.

30. The computer program product of claim 28, further comprising ordering subsequent constellation in an ascending order by a distance to the first point.

31. The computer program product of claim 30, further comprising restricting a search space based on an energy value.

32. The computer program product of claim 31, further comprising puncturing the resulting constellation of to remove some of the high energy valued constellation points with large number of immediate neighbors by other constellation points with fewer number of immediate neighbors.

33. The computer program product of claim 25, wherein a first state in the horizontal axis is chosen as an arbitrary constellation point.

34. The computer program product of claim 25, wherein an all-zero codeword is assigned to a first constellation point.

35. The computer program product of claim 25, wherein the path includes 2-tuple elements for an earlier constellation point and the corresponding codeword.

36. The computer program product of claim 25, further comprising continuously pruning incompetent paths.

* * * * *